United States Patent
Kumar et al.

(10) Patent No.: US 10,328,922 B2
(45) Date of Patent: Jun. 25, 2019

(54) TRAIN BRAKE SAFETY MONITORING AND FAULT ACTION SYSTEM WITH PTC BRAKE PERFORMANCE ASSURANCE

(71) Applicant: NEW YORK AIR BRAKE, LLC, Watertown, NY (US)

(72) Inventors: Deepak Kumar, Kingston (CA); Folkert Horst, Ottawa (CA)

(73) Assignee: NEW YORK AIR BRAKE, LLC, Watertown, NY (US)

( * ) Notice: Subject to any disclaimer, the term of this patent is extended or adjusted under 35 U.S.C. 154(b) by 0 days.

(21) Appl. No.: 15/405,362

(22) Filed: Jan. 13, 2017

(65) Prior Publication Data
US 2017/0203745 A1 Jul. 20, 2017

Related U.S. Application Data

(60) Provisional application No. 62/279,232, filed on Jan. 15, 2016.

(51) Int. Cl.
*B60T 17/22* (2006.01)
*B61L 3/00* (2006.01)
(Continued)

(52) U.S. Cl.
CPC ............ *B60T 17/228* (2013.01); *B61L 3/008* (2013.01); *B61L 15/0072* (2013.01);
(Continued)

(58) Field of Classification Search
CPC ...... B60T 17/228; B61L 25/02; B61L 25/021; B61L 15/0072; B61L 15/0081; B61L 3/0081
(Continued)

(56) References Cited

U.S. PATENT DOCUMENTS 3,964,702 A * 6/1976 Lardennois ............. B61L 23/24
246/4
4,095,764 A * 6/1978 Osada ..................... B61L 3/225
104/298
(Continued)

FOREIGN PATENT DOCUMENTS

EP 1070649 1/2001
WO 2012/092557 7/2012

OTHER PUBLICATIONS

International Search Report Form PCT/ISA/220, International Application No. PCT/US2017/013372, pp. 1-15, dated Mar. 31, 2017.

*Primary Examiner* — Angelina Shudy
(74) *Attorney, Agent, or Firm* — Bond Schoeneck and King PLLC; David Nocilly

(57) ABSTRACT

An intelligent, on-board, train brake safety monitoring and fault action system is disclosed. The system compares measured dynamic train brake performance using on-board train control system, such as a LEADER® system. Using the measured dynamic train brake performance, the brake monitoring system can determine whether the train is capable of stopping within a particular required distance, such as a stop distance set by a positive train control system in which the train is participating. The ongoing ability to meet external braking criteria, such as compliance with positive train control stop distances, may be used to extend the interval between any mandated train brake inspections and tests.

14 Claims, 2 Drawing Sheets

Figure 1:
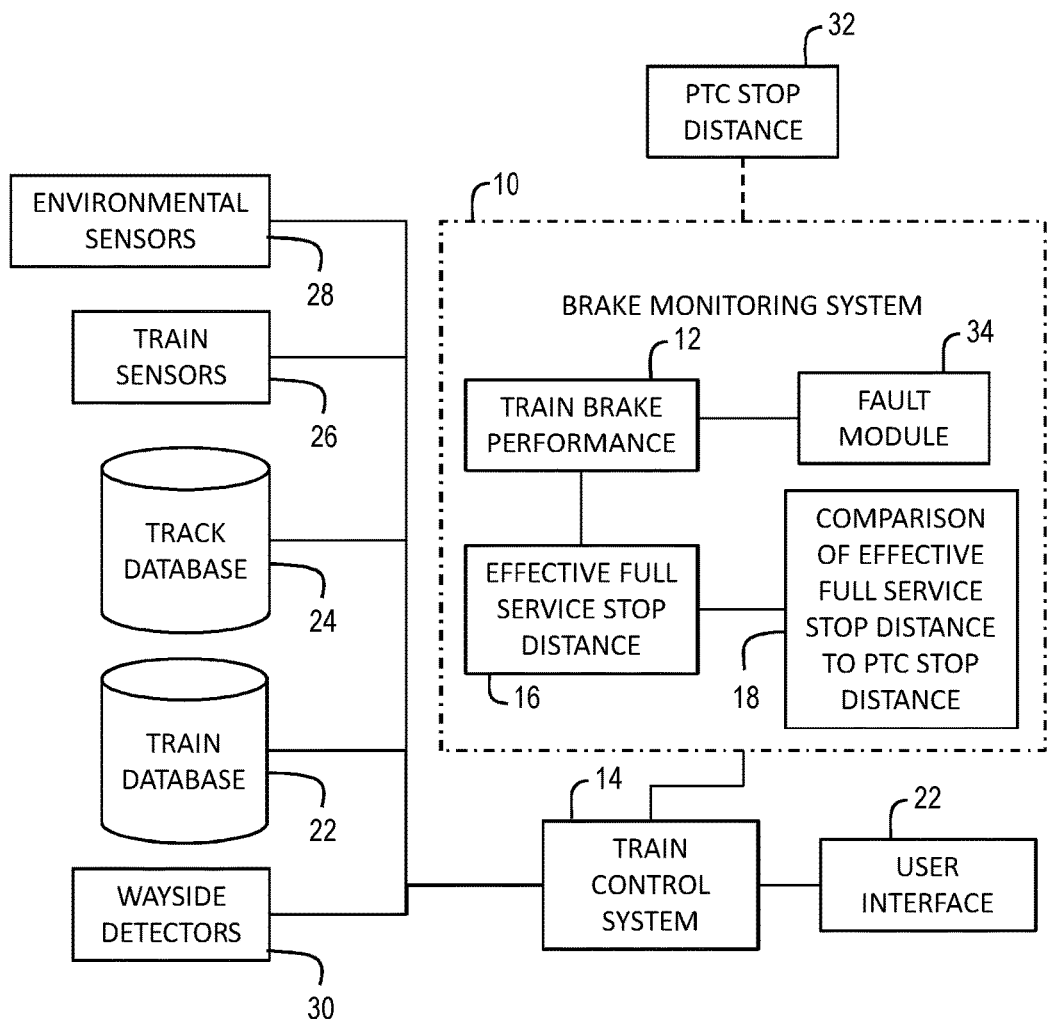

(51) Int. Cl.
   *B61L 15/00*   (2006.01)
   *B61L 25/02*   (2006.01)
(52) U.S. Cl.
   CPC ........... *B61L 15/0081* (2013.01); *B61L 25/02*
           (2013.01); *B61L 25/021* (2013.01)
(58) Field of Classification Search
   USPC .......................................................... 701/19
   See application file for complete search history.

(56) References Cited

U.S. PATENT DOCUMENTS

| | | | | |
|---|---|---|---|---|
| 4,302,811 | A * | 11/1981 | McElhenny | B61L 3/125 246/182 B |
| 4,410,154 | A * | 10/1983 | Matty | B61L 3/008 246/182 B |
| 4,800,991 | A * | 1/1989 | Miller | B60T 17/22 116/208 |
| 5,285,190 | A * | 2/1994 | Humphreys | B60T 17/221 116/208 |
| 5,740,046 | A * | 4/1998 | Elestedt | B61L 25/021 340/991 |
| 5,744,707 | A * | 4/1998 | Kull | G01L 5/28 340/453 |
| 5,813,635 | A * | 9/1998 | Fernandez | B61L 15/0027 246/168 |
| 6,263,266 | B1 | 7/2001 | Hawthorne | |
| 8,311,689 | B2 | 11/2012 | Plawecki et al. | |
| 8,554,397 | B1 * | 10/2013 | Nishinaga | B61L 3/008 701/19 |
| 8,620,550 | B2 | 12/2013 | Pfohl | B60T 1/062 701/22 |
| 8,910,753 | B1 * | 12/2014 | De La Cerda | B60T 17/221 188/1.11 L |
| 9,283,945 | B1 * | 3/2016 | Kernwein | B60T 17/228 |
| 9,296,379 | B2 | 3/2016 | Oswald et al. | |
| 9,296,401 | B1 * | 3/2016 | Palmer | B61L 15/0072 |
| 9,580,090 | B2 | 2/2017 | Kumar | |
| 9,714,041 | B2 * | 7/2017 | Oswald | B61L 15/0063 |
| 9,873,419 | B2 * | 1/2018 | Wallace | B60T 17/228 |
| 2005/0065677 | A1 * | 3/2005 | Leblanc | G01L 5/284 701/33.7 |
| 2006/0020377 | A1 * | 1/2006 | Goetz | B60T 17/22 701/32.6 |
| 2006/0163943 | A1 * | 7/2006 | Von Holt | B60K 31/0008 303/177 |
| 2008/0051969 | A1 * | 2/2008 | Demaya | B61L 3/008 701/79 |
| 2008/0306641 | A1 * | 12/2008 | Matusiak, Jr. | B61L 15/009 701/19 |
| 2010/0030490 | A1 * | 2/2010 | Wright | F16D 66/02 702/34 |
| 2010/0204857 | A1 * | 8/2010 | Forrest | B61L 27/0094 701/19 |
| 2010/0302021 | A1 * | 12/2010 | Gaughan | B60T 7/042 340/453 |
| 2011/0046827 | A1 * | 2/2011 | Yoon | B61L 3/006 701/20 |
| 2011/0308897 | A1 * | 12/2011 | Wallace | F16D 65/28 188/1.11 R |
| 2012/0072088 | A1 * | 3/2012 | Cutright | B60T 13/665 701/70 |
| 2012/0221184 | A1 * | 8/2012 | Pfohl | B60T 1/062 701/22 |
| 2012/0323957 | A1 * | 12/2012 | Rout | B61L 3/006 707/769 |
| 2013/0116864 | A1 * | 5/2013 | Tokumaru | B61L 15/0027 701/19 |
| 2014/0244080 | A1 * | 8/2014 | Herden | B60T 17/228 701/19 |
| 2015/0217790 | A1 * | 8/2015 | Golden | B61L 15/0072 701/19 |
| 2015/0307119 | A1 * | 10/2015 | Ghaly | B61L 27/0038 246/122 R |
| 2016/0107631 | A1 * | 4/2016 | Wallace | B60T 13/665 188/1.11 E |
| 2016/0186828 | A1 * | 6/2016 | Goncalves | F16D 66/028 188/1.11 W |
| 2016/0318497 | A1 * | 11/2016 | Wright | B60T 17/228 |
| 2016/0359741 | A1 * | 12/2016 | Cooper | B61C 17/12 |
| 2017/0106884 | A1 * | 4/2017 | Oswald | B61L 15/0063 |
| 2017/0240157 | A1 * | 8/2017 | Heller | B60T 13/665 |
| 2017/0255824 | A1 * | 9/2017 | Miller | G06K 9/00624 |
| 2018/0326956 | A1 * | 11/2018 | Zhu | B60T 7/22 |
| 2018/0327008 | A1 * | 11/2018 | Kindt | B61L 1/18 |

\* cited by examiner

TRAIN BRAKE SAFETY MONITORING AND FAULT ACTION SYSTEM WITH PTC BRAKE PERFORMANCE ASSURANCE

CROSS-REFERENCE TO RELATED APPLICATIONS

The present application claims priority to U.S. Provisional Application No. 62/279,232, filed on Jan. 15, 2016.

BACKGROUND OF THE INVENTION

1. Field of the Invention

The present invention relates to train braking systems and, more particularly, to a brake monitoring system.

2. Description of the Related Art

The braking power of a train is typically the subject of strict government requirements that are designed to ensure the safe operation of trains. Currently, there is no on-board brake monitoring system for an AAR freight train. As a result, in the United States, the Federal Railroad Administration (FRA) has issued complex and burdensome rules governing train braking. For example, the FRA rules require that one hundred percent of the brakes on a train shall be effective and operative brakes prior to use or departure from certain locations. Furthermore, the train shall not move if less than 85 percent of the cars in a train have effective and operative brakes. The failure of the actual braking power of the train to exceed certain thresholds requires the train to be taken out of the service. The FRA rules also require that a train must be stopped at a qualified location every 1000 miles, more or less, depending on numerous factors, including if cars are added or removed from the train. The terminal test is burdensome as it requires the train to be sided at an approved rail yard for the test and inspection and those rail yards are often congested with other trains to be tested, trains being made up, and cars being transferred from one train to another. In addition, the terminal test is lengthy and can only be done by certain qualified personnel.

Positive Train Control (PTC) and Advanced Train Control systems (ATCS) monitor train speed and train position during a stop, and take action if the train is going too fast or not slowing rapidly enough to assure that it comes to a stop within the required distance. While the stop distance calculation performed by PTC and ATCS systems makes assumptions about the amount of brake power available on the train, it does not accurately reflect the braking power of the train at given point in time. Instead, the PTC/ATCS stop distance calculation is necessarily conservative, as PTC/ATCS systems and block signal systems are designed with the statistical assurance that the train will always have sufficient brake power to stop in less distance than that calculated by the safety system. Accordingly, there is a need in the art for a system that can accurately monitor train brake effectiveness and provide on-board brake monitoring that can accurately determine whether the train can brake within required distances without the need to for frequent periodic train brake inspection and tests.

BRIEF SUMMARY OF THE INVENTION

The system determines the actual braking power of the train on the first and all subsequent brake applications. The system then calculates the theoretical full service stop distance for current train conditions, including the actual train brake power, train speed, track gradient and curvature, train drag, etc. and verifies that the calculated stop distance is less than the PTC/ATCS requirement. Whenever the train condition (speed, grade, drag, etc) changes in a way that would result in a longer stop distance, the system can re-calculate the effective full service stop distance for current train conditions and re-verify that the calculated stop distance remains less than the PTC/ATCS requirement. The system may optionally calculate and display the brake efficiency for the train driver, which may be defined as the PTC/ATCS stop distance divided by the calculated stop distance. An efficiency greater than one means the train in its current state has a positive margin of brake capacity. An efficiency less that one means the train does not meet the PTC/ACTS stop distance requirement under current conditions. If the brake efficiency is less than one, the system may instruct the train driver to take certain actions, like reducing speed, reducing throttle notch, applying brakes, etc. The system may also look ahead on the train route to determine and inform the driver what actions the driver should take to optimally satisfy the PTS speed limits and stop locations. As the system determines the actual train brake power each time a new brake application is made, changes in train brake performance over a route will be taken into consideration and used for subsequent stop distance calculations.

The present invention also includes a method of ensuring that a train complies with a braking safety standard. The first step involves calculating the actual brake performance exhibited by a train during operation of the train based on an actual brake application. The next step is determining an actual stopping distance of the train based on the actual brake performance exhibited by the train. Finally, the method involves the step of comparing the determined actual stopping distance of the train against a predetermined standard train stopping distance to determine whether the train can actually stop within the predetermined standard train stopping distance. The step of calculating the actual brake performance includes the step of adjusting for any environmental conditions that may change train resistance. The method may further include the step of providing a notification when the determined actual stopping distance of the train exceeds the predetermined standard train stopping distance.

BRIEF DESCRIPTION OF THE SEVERAL VIEWS OF THE DRAWING(S)

Figure 2:
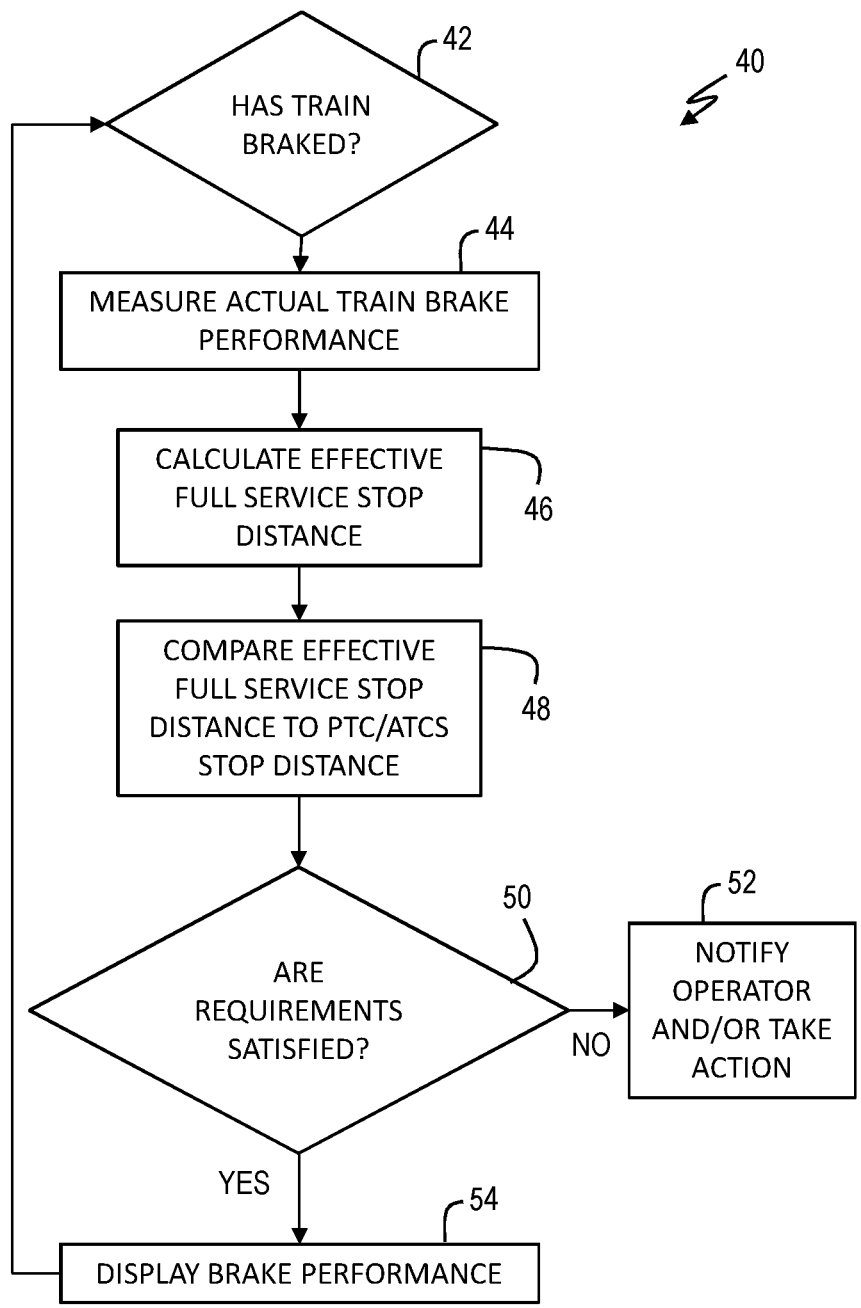

The present invention will be more fully understood and appreciated by reading the following Detailed Description in conjunction with the accompanying drawings, in which:

FIG. 1 is a schematic of a train brake monitoring system according to the present invention integrated with a train control system; and FIG. 2 is a flowchart of exemplary processing in a train brake monitoring system according to the present invention.

DETAILED DESCRIPTION OF THE INVENTION

Referring now to the drawings, wherein like reference numerals refer to like parts throughout, there is seen in FIG. 1 an intelligent, on-board, train brake safety monitoring and fault action system 10. Brake monitoring system 10 comprises a train brake performance module 12 that dynamically determines the effective stopping distance for the train based on actual brake performance and then compares the effective stopping distance to any train brake performance requirements or PTC/ACTS system requirements. Brake monitoring system 10 is preferably adapted to interface with an on-board train control system 14, such as the LEADER® system available from New York Air Brake of Watertown, N.Y., which includes a train manifest, train dynamic modeling algorithms, GPS correlation to locally stored track profiles, train speed, train acceleration, measured brake pipe pressure, flow and gradient and driver brake commands. Brake monitoring system 10 may be provided as a stand-alone unit or be incorporated directly into a train control system by programming the train control system to perform the operations of the system described herein.

Brake monitoring system 10 is configured to measure actual train brake performance using train brake performance module 12 and then calculate how long the train will take to come to a full stop, using an effective full service stop distance module 16. Effective full service stop distance module 16 calculates an Effective Full Service Stop Distance using the measured actual train brake performance of train brake performance module 12 as well as other train performance variables, such as full service brake pressure, and the actual conditions of the train, including speed and gradient. The Effective Full Service Stop Distance of the present invention represents the distance the train will take to stop if a full service brake application is made and is used to gauge whether the train is currently capable of stopping within prescribed limits based on current brake performance. For example, a remotely positioned independent PTC/ATCS system controlling operation of the train will regularly and periodically communicate a PTC/ATCS stop distance 32 to the train. The PTC/ATCS stop distance is a safety factor and requires that the train be capable of stopping within the PTC/ATCS stop distance. The Effective Full Service Stop Distance of the present invention may thus be compared to the PTC/ATCS stop distance using a comparison module 18 to determine whether the train brakes are actually capable of stopping the train as required rather than relying on estimates of train braking power that are not based on the current braking power of the train or the current conditions of the train. As the PTC/ATCS stop distance received from the PTC/ACTS system is calculated using conservative assumptions about the effective braking of the train and is the basis for the PTC/ATCS safety system, as long as the Effective Full Service Stop Distance is less than (or equal to) the PTC/ATCS stop distance, the train is assumed to be safe and will have sufficient braking power to stop within the limits set by the PTC/ATCS system. The Effective Full Service Stop Distance (or related calculations) may be provided to the PTC/ATCS system by the train to allow for central monitoring or tracking of train performance.

In the absence of an external source providing a stopping distance criteria or brake performance reference threshold, such as the PTC/ATCS system providing a finite stop distance, the brake performance system may be programmed to calculate its own stopping distance safety criteria locally for evaluation against the Effective Full Service Stop Distance. For example, the same type of algorithms used by a PTC/ATCS system to generate the PTC/ATCS stop distance could be programmed directly into the brake performance system and used to generate the stopping distance criteria locally, thereby enabling the brake performance system to achieve the same safety as that of a PTC/ATCS system in a non-PCT/ATCS environment where there is no separate PTC/ATCS system to provide the stopping distance criteria.

The Effective Full Service Stop Distance may be mathematically compared to the PTC/ATCS stop distance in many different ways by comparison module 18 and evaluated against to a predetermined standard to determine whether the Effective Full Service Stop Distance is sufficient. For example, brake monitoring system 10 can calculate a brake performance metric that represents the capability of the train to perform with the parameters set by the PTC/ATCS system. One acceptable metric may be the PTC/ATCS stop distance divided by the Effective Full Service Stop Distance to generate safe braking ratio that can be used to evaluate compliance with the PTC/ATCS system requirements. If the actual ratio as determined by brake monitoring system 10 is greater than a predefined safe brake ratio, such as 1.33, which means the Effective Full Service Stop Distance is at least 25 percent shorter than the PTC/ATCS stop distance, the train brakes may be assumed to be fully sufficient and not in need of an inspection stop and testing.

If the brake performance metric reveals that the train is not capable of achieving the PTC/ATCS stop distance, brake monitoring system 10 may notify the train driver, such as by providing a notice to the driver via the user interface 20 associated train control system 14, that an inspection stop and testing of the brakes is needed. Additionally, if the brake performance metric reveals that the Effective Full Service Stop Distance has degraded below a second threshold, such as a ratio less than or equal 1 (plus a safety margin), brake monitoring system 10 can signal or command train control system 14 to take affirmative or automatic action to improve train safety by, for example, slowing the train speed until the brake performance metric improves sufficiently, enforcing a penalty brake application, or informing the PTC system and allowing the PTC system to take appropriate action.

Brake monitoring system 10 may interact with train control system 14 to provide an on-board display on user interface 20 that allows the train driver to monitor actual brake performance. For example, brake monitoring system 10 can display a metric such as a Brake Inspection Distance that comprises an adjustable counter representing the remaining distance until a physical train inspection and braking test is required under applicable government or industry regulations. The brake inspection distance counter may be decremented as the train progresses to reflect that the time to an inspection is growing closer. However, brake monitoring system 10 may be programmed to increment the remaining distance counter by a pre-determined amount if a brake application and corresponding stop distance calculation verifies the train remains capable of stopping within the PTC/ATCS limit. For example, a brake performance metric that is better than some predefined safe brake threshold, for example greater than 1.33, can be used to delay the need for an inspection, thus avoiding costly downtime.

In use, brake monitoring system 10 can be programmed to implement an initialization step, where the engineer is prompted to confirm that the train has passed the appropriate test or tests in the country where the train is located, such as a Class 1 brake test per 49 C.F.R. 232.103 in the United States. As an alternative, a brake system inspector could enter the appropriate testing data directly into the system, via user interface 20 of train control system 14 or a remotely connected terminal, thereby creating a digital record of the inspection. This confirmation is then recorded by brake monitoring system 10, the brake inspection distance counter reset to the application requirements, such as 1000 miles per 49 C.F.R. 232.207 in the United States. In the example of a LEADER® system acting as train control system 14, the initialization step can be integrated into the existing LEADER® system initialization sequence. Alternatively, if the train is already in operation, the engineer can be prompted via user interface 20 to confirm that the train meets the requirements for a continuing train, i.e., no more than one pick-up or set out per 49 C.F.R. 232.213, in which case the previous brake inspection counter value will be maintained. After initialization, the brake inspection distance counter can decrement as the train progresses with the current brake inspection indicated on a graphical user interface (GUI) such as a sub-menu screen that is accessible to the engineer. Next, each time the train brakes are applied for more than a predetermined period of time, such as 20 seconds, brake monitoring system 10 performs the Effective Full Service Stop Distance calculation and evaluates this against the applicable requirement, such as a PTC/ATCS stop distance. A compliant braking event is declared if the predicted stopping distance is sufficiently shorter than the required braking distance as described above. After a predetermined number of successive, compliant braking events, such as two, the brake inspection distance counter can be incremented by a predetermined amount, such as 500 miles to a maximum total counter value of 1000 miles, and the action recorded by the system. The engineer can be alerted by a screen message each time the brake inspection distance is incremented. If the braking distance counter falls below a predetermined threshold, such as 100 miles, the engineer can be alerted by a screen message denoting that a brake inspection is required in the near future. It should be recognized that the system can make various information available for display to the train driver, such as the maximum distance to the next required brake inspection, the history of previous braking events that were used to adjust the counter, etc. Preferably, all actions that result in a change to the brake inspection distance should be recorded as a time stamped entry in the existing locomotive event recorder associated with the train control system to preserve the record.

Actual brake power may be calculated dynamically from the actual deceleration rate (rate of change of speed) of the train as a result of a particular brake application. For example, the actual brake power may be determined based on the following formula:

$$\text{Brake Force} = N*W*A_{train}/G - \text{Train Resistance} - \text{Force}_{Grade} - F_{curvature}$$

The data required by this calculation may be gleaned from existing sources available to the train control system, such as the train database 22, track database 24, and train sensors 26. As the formula takes into account changes in train resistance and the forces on the train due to track grade and track curvature, brake monitoring system provides a dynamic measurement of actual train brake power. The precision of the calculation may be further improved by taking into consideration environmental effects such as temperature, precipitation, wind speed and wind direction as variables such as train resistance can be correlated to these environmental effects. Environmental parameters can be obtained from onboard environmental sensors 28 (e.g., temperature sensors, wind gauges, etc.) or communicated to system 10 from wayside detectors 30 or a remote host. The environmental parameters can be used to improve the estimation of the train resistance and thus provide more accurate predictions of the braking force and stopping distance for the train.

Referring to FIG. 2, system 10 may thus implement a brake monitoring process 40. Once a train braking event has been detected by a check 42 and the current actual brake force of the train is determined 44, brake monitoring system 10 calculated the Effective Full Service Stop Distance 46 for the current train state, using the measured brake effectiveness, train speed, train acceleration, train resistance (rolling resistance), and track gradient. For example, the actual stopping distance may be determined using standard train dynamic formulas described in literature in the field that can be used to calculate stopping distances from brake effectiveness and known variables such as track grade. The Effective Full Service Stop Distance can also be calculated using custom approaches based on the laws of physics, the train characteristics, and adjustments based on train and environmental conditions, such as wind, temperature, weather conditions, etc. It should be recognized that system 10 may also receive and consider other data relating to brake performance, such as information received from wayside hot and cold wheel detectors and related wayside inspection systems to ensure that the actual brake performance measurement is as accurate as possible.

The calculated Effective Full Service Stop Distance is then be compared to the current PTC/ATCS stop distance required by the PTC/ATCS system (or other applicable stopping requirement) 48. A check 50 may be performed to determine whether the applicable requirements are satisfied and, if not, appropriate action taken 52. For example, brake monitoring system 10 may provide feedback to the train driver of the brake performance metric, for example the ratio of PTC/ATCS stop distance divided by the calculated stop distance. If the brake efficiency is less than one, plus some margin for uncertainty, for example 1.05, then the system (via the train control system) may instruct the train driver to reduce speed by reducing the throttle and/or making dynamic, independent, and/or train brake applications to reduce the train speed so that the train is capable of stopping within the PTC/ATCS limit. In the event that the brake efficiency is less than predefined safe brake threshold, the system may inform the PTC/ATCS system that the train is not capable of meeting the PTC/ATCS brake curve and/or initiate a penalty brake to bring the train to a stop. If check 48 determines that the current brake performance can provide an Effective Full Service Stop Distance that meets the applicable criteria, the existence of adequate brake performance can be displayed for the driver 54.

A train control system, such as the LEADER® system, includes or is associated with an on-board track database 24 with track gradients and track curvatures and a GPS receiver (or other locating system) to locate the train on the track database. With the effective brake power computed by brake monitoring system 10, train control system 14 can calculate how the train will operate in the future and then advise the train driver how to optimally control the train to conform to the PTC speed and distance limits. For example, the train driver can avoid exceeding any PTC limits, which has a corresponding PTC penalty action, and can avoid overbraking that slows the train too much and results in a train that stops short of a PTC target.

Because brake monitoring system 10 is constantly evaluating the actual train brake performance and periodically calculating the Effective Full Service Stop Distance based on current train conditions, train control system 14 can always know when the train is capable of stopping within the requirements of the PTC/ATCS stop distance and when it cannot. If the train is unable to meet the requirements, brake monitoring system 10 can advise the train driver to reduce speed or take other action that brings the train into a safe state so that is can stop within the requirements of the PTC/ATCS system. In this way, brake monitoring system 10 can prevent or avoid penalty brake and/or emergency brake applications that would otherwise be commanded by the PTC/ATCS system by instructing the train driver to control the train speed in a way that allows the train to stop within the PTC/ATCS requirements. Because brake monitoring system 10 can re-evaluate the actual train brake power each time a brake application is made, changes in actual train brake power that result from a degradation of the brakes will included in the stopping distance calculation, thereby proving a dynamic and accurate Effective Full Service Stop Distance.

Brake monitoring system 10 can thus provide a significant improvement to a PTC/ATCS system. While a conventional PTC/ATCS system can take action when a train exceeds safe limits during a stop, brake monitoring system 10 provides an actual measured train braking performance. Brake monitoring system 10 can then calculate the actual stopping distance for the train, taking into consideration current train conditions of train speed, gradient, train drag, wind, etc. and verify that that actual stop distance is less than or equal to that required by the PTC/ATCS system. As a result, the system may be used to extend the interval between any mandated train brake inspections and tests by providing real time monitoring of the train effective brake and verifying that the train has sufficient braking power to stop within the limits of the PTC/ATCS stop distance.

Brake monitoring system 10 may alternatively verify that the train has at least a certain amount of effective brakes (e.g., 85 percent effective brakes under FRA regulations) and, if so, extend the interval between any mandated train brake inspections and tests by incrementing the counter described above and/or providing a visual indicator of brake performance. Brake efficiency can be calculated by comparing the actual train brake performance against the expected brake performance as determined by either calculating the brake performance that train should have based on its composition or calculating the actual brake performance when the train is assumed to have 100 percent operational brakes, i.e., immediately after a full brake inspection reveals that all brakes are in working condition.

Brake monitoring system 10 may additionally be used to improve train force monitoring and characterization when certain terms in the actual brake power equation are known to be zero. For example, when the actual brake force is known to be zero (such as when the brakes are not applied), tractive effort is zero (no traction is being applied), grade forces are zero (the train is on level track), and/or curve forces are zero (train is on tangent track), the force components may be more accurately computed. As these conditions occur regularly throughout a train trip, the monitoring of train acceleration during times when one or more of these terms is zero provides for more accurate computation of the individual force.

Train resistance is a significant factor in the stopping performance of the train and can vary significantly due to environmental conditions, particularly wind speed and direction. By real time monitoring and decomposition of the train forces into their component parts for reevaluation on a real-time basis, a more precise estimation of the predicted stopping distance at any given time is possible.

Another situation of particular interest is the time just prior to or just after a brake application. If a brake application is being used to determine the actual braking power of the train, the acceleration of the train immediately before or after the brake application may be used to provide insight into the other forces acting on the train, such as train resistance, so that the appropriate variables in the force calculation can be updated concurrently with collection of brake performance data. For example, system 10 may include a fault module 34 that is configured to detect abnormal braking system conditions, such dragging or stuck railcar brakes. It is not unusual for rail car brakes to inadvertently become stuck or drag due to a malfunction of the railcar brake system. If left to persist, these conditions can cause extensive damage to the wheels on the railcar or the track structure itself. System 10 may determine that one of the conditions has occurred based on an increase of train resistance that is not due to other circumstances, such as a change in track grade or curvature or change in weather conditions. As stuck brakes will usually occur immediately after a brake application and release cycle, system 10 may be programmed to provide an alert to the train driver or railroad when there is a abnormal or unexpected increase in train resistance after a brake application and release as compared to the train resistance as measured before the brake application.

Information provided by system 10 may also be used to change the operation of the train during a trip. For example, a decline in actual train brake performance may be dynamically adjusted to compensate for, among other things, the loss of car brakes by increasing the independent brake contribution and by dynamically increasing brake pipe pressure to increase the brake power of the properly functioning cars in the train to compensate for loss of brakes on individual cars. Similarly, a reduction of actual brake performance of the train below a predetermined threshold may be used to dynamically adjust the train speed limits that are in place in train control system 14 over the route of the train.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A system for monitoring and controlling the braking of a train, comprising:
   a train control system for installation in a locomotive of a train and interconnection to a plurality of sensors that detect and output data representing forces being experienced by the train;
   a brake monitoring system associated with the train control system for receiving the data output from the plurality of sensors, wherein the system includes
   a first module programmed to calculate an actual brake performance exhibited by a train during operation of the train;

a second module programmed to determine an actual stopping distance of the train based on the actual brake performance exhibited by the train;

a third module programmed to compare the actual stopping distance of the train against a predetermined standard train stopping distance; and wherein the brake monitoring system is configured to provide a notification to a train driver via the train control system regarding comparing of the actual stopping distance of the train against the predetermined standard train stopping distance and to automatically cause a change in the operation of the train via the train control system when the third module determines that the actual stopping distance of the train is not within the predetermined standard train stopping distance.

2. The system of claim 1, wherein the actual brake performance of the train is calculated based on a measurement taken during an actual brake application of the train.

3. The system of claim 2, wherein the actual stopping distance of the train is calculated from the actual brake performance, a full service brake pressure, and at least one train condition.

4. The system of claim 3, wherein the at least one train condition is selected from the group consisting of train speed, track gradient, and track curvature.

5. The system of claim 4, wherein the third module is programmed to compare the actual stopping distance of the train against the predetermined standard stopping distance by calculating a ratio of the actual stopping distance to the predetermined standard stopping distance.

6. The system of claim 5, further comprising a fourth module programmed to provide an indication whether the actual stopping distance of the train is within the predetermined standard train stopping distance.

7. The system of claim 6, wherein the predetermined standard train stopping distance comprises a positive train control system stop distance.

8. The system of claim 7, wherein the first module is programmed to adjust the calculation of the actual brake performance based on at least one environmental condition.

9. The system of claim 8, wherein the first module is programmed to determine an actual train resistance for the train prior to or after the actual brake application.

10. The system of claim 1, further comprising an adjustable counter representing a remaining distance before the train is required to be inspected.

11. The system of claim 10, wherein the adjustable counter is incremented if the actual stopping distance of the train is within the predetermined standard train stopping distance.

12. The system of claim 1, further comprising a fault module programmed to determine whether any brakes of the train are stuck based on an increase in train resistance after a brake application and release.

13. A method of ensuring that a train complies with a safety standard, comprising the steps of:

calculating an actual brake performance exhibited by a train during operation of the train based on an actual brake application by collecting data representing any forces being experienced by the train from a plurality of sensors that are associated with a train control system installed on the train;

determining an actual stopping distance of the train based on the actual brake performance exhibited by the train; and comparing the actual stopping distance of the train against a predetermined standard train stopping distance to determine whether the train can stop within the predetermined standard train stopping distance; and providing a notification to a train driver via the train control system of the determined actual stopping distance of the train; and automatically slowing the train via the train control system when the determined actual stopping distance of the train exceeds the predetermined standard train stopping distance.

14. The method of claim 13, wherein the step of calculating the actual brake performance includes adjusting for any environmental conditions by adjusting the actual brake performance based on how the environmental conditions affect train resistance.

* * * * *